United States Patent [19]
Ueda

[11] Patent Number: 4,859,091
[45] Date of Patent: Aug. 22, 1989

[54] WORD PROCESSOR INCLUDING SPELLING VERIFIER AND CORRECTOR

[75] Inventor: Hiroyuki Ueda, Yokohama, Japan

[73] Assignee: Canon Kabushiki Kaisha, Tokyo, Japan

[21] Appl. No.: 61,971

[22] Filed: Jun. 15, 1987

[30] Foreign Application Priority Data

Jun. 20, 1986 [JP] Japan ................... 61-145622

[51] Int. Cl.$^4$ ............................... B41J 5/30
[52] U.S. Cl. ........................ 400/63; 400/83; 364/419
[58] Field of Search ............... 400/63, 83, 110, 17, 400/144.2, 705.1; 364/419

[56] References Cited

U.S. PATENT DOCUMENTS

| | | | |
|---|---|---|---|
| 3,630,336 | 12/1971 | Johnson et al. | 400/17 |
| 4,136,395 | 1/1979 | Kolpek et al. | 400/63 X |
| 4,381,551 | 4/1983 | Kanou et al. | 400/83 X |
| 4,381,553 | 4/1983 | Ferguson | 400/17 X |
| 4,389,641 | 6/1983 | Nakanishi et al. | 400/83 X |
| 4,392,758 | 7/1983 | Bowles et al. | 400/17 X |
| 4,439,838 | 3/1984 | Klingenberg | 400/83 X |
| 4,464,069 | 8/1984 | Yamada et al. | 400/83 |
| 4,484,305 | 11/1984 | Ho | 400/83 X |
| 4,500,216 | 2/1985 | Demonte et al. | 400/17 X |
| 4,558,965 | 12/1985 | Ueda et al. | 400/144.2 |
| 4,580,241 | 4/1986 | Kucera | 400/63 X |
| 4,590,560 | 5/1986 | Sado | 364/419 |
| 4,615,631 | 10/1986 | Ueda et al. | 400/705.1 |
| 4,655,620 | 4/1987 | Adams et al. | 400/83 X |
| 4,671,684 | 6/1987 | Kojima et al. | 400/63 |
| 4,672,571 | 6/1987 | Bass et al. | 400/63 X |
| 4,674,065 | 6/1987 | Lange et al. | 400/63 X |
| 4,674,066 | 6/1987 | Kucera | 400/63 X |
| 4,689,768 | 8/1987 | Heard et al. | 400/63 X |

FOREIGN PATENT DOCUMENTS

82/00442  2/1982  World Int. Prop. O. .......... 400/110

OTHER PUBLICATIONS

IBM Technical Disclosure Bulletin, "Printer and/or Display System Apparatus for Forming Lines," Herrold et al, vol. 22, No. 4, Sep. 1979, pp. 1340-1343.
IBM Technical Disclosure Bulletin, "Automatic Continuous Underscoring of Characters, Words or Phrases", Adam et al, vol. 24, No. 8, Jan. 1982, p. 4132.
IBM Technical Disclosure Bulletin, "Overprint Circuit", Tokunaga, vol. 26, No. 1, Jun. 1983, pp. 284-285.
IBM Technical Disclosure Bulletin, "Method for Detecting and Correcting Selected Word Spelling Errors in a Text Processing System", Barker et al, vol. 25, No. 8, Jan. 1983, p. 4225.
IBM Technical Disclosure Bulletin, "Interactive Spelling Correction Air for a Text Processing System", Hernandez et al, vol. 25, No. 8, Jan. 1983, pp. 4227-4228.
IBM Technical Disclosure Bulletin, "Concurrent Edit and Spell Check in a Computer System Having Multiple Processors", vol. 29, No. 1, Jun. 1986, pp. 396-398.

Primary Examiner—Ernest T. Wright, Jr.
Attorney, Agent, or Firm—Fitzpatrick, Cella, Harper & Scinto

[57] ABSTRACT

There is disclosd a word processor capable of spelling verifying and correcting function with a limited display space. If a word is misspelled in an entered sentence, plural candidate correct spellings are displayed together with the entered sentence and in a suitable position relative to the sentence, thus facilitating the correction of spelling by the user.

15 Claims, 6 Drawing Sheets

Fig. 4
Spel
↓
Sped
↓
Spew
↓
Spell
Fig. 5
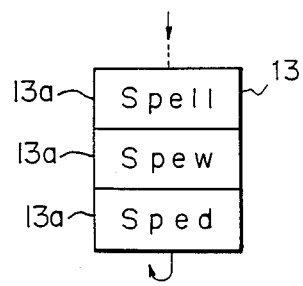
Fig. 6
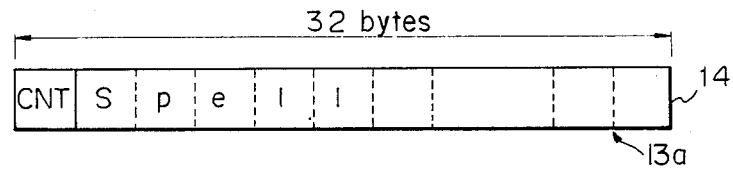
Fig. 7

Fig. 9 a) How do you spew˄ Mississippi ?
       31 b) How do you spe˄ Mississippi ?⟵
       31 c) How do you sp˄ Mississippi ?⟵
       31 d) How do you s˄ Mississippi ?⟵
       31 e) How do you ˄ Mississippi ?⟵
       31 f) How do you s˄ Mississippi ?⟵
       31 g) How do you sp˄ Mississippi ?⟵
       31 h) How do you spe˄ Mississippi ?⟵
       31 i) How do you spel˄ Mississippi ?
       31 j) How do you spell˄ Mississippi ?⟶
       31

▲: CURSOR

WORD PROCESSOR INCLUDING SPELLING VERIFIER AND CORRECTOR

BACKGROUND OF THE INVENTION

1. Field of the Invention

The present invention relates to a word processor, and more particularly to a spelling verifier and corrector, a new technology for checking the spelling of a word and showing candidates for correct spelling of the word.

2. Related Background Art

The spelling verifier and corrector, recently employed in word processors for the English language, is used for detecting a misspelling and suggesting candidate correct words for the misspelled word. Usually there are shown plural candidate words for a misspelled word.

In the correction of a misspelled word, in word processors with a large display such as a cathode ray tube, the display area is divided to simultaneously display plural candidate correct words estimated from the misspelled word, as well as the associated text being processed. However, in an electronic typewriter as shown in FIG. 1, the capacity of the display unit 4 is limited, for example to 2 rows, and may be less than the number of rows required to display the candidate words. Therefore, the technology for a large display unit cannot be directly utilized in this case.

SUMMARY OF THE INVENTION

In consideration of the foregoing, an object of the present invention is to eliminate the abovementioned drawbacks.

Another object of the present invention is to provide a technology for applying a spelling verifier and corrector capable of generating candidate words of a number larger than the capacity of the display unit, to a word processor, particularly an electronic typewriter.

Still another object of the present invention is to provide a word processor allowing the user to easily correct the spelling with reference to the preceding and succeeding words, by displaying candidate correct words for a misspelled word in a position related to a row of words containing that misspelled word.

Still another object of the present invention is to provide a word processor capable of displaying a candidate correct word for a misspelled word, in a position corresponding to the misspelled word in a row of words which are being entered or edited, and displacing the succeeding words according to the number of letters of the displayed candidate word. Accordingly, the candidate word is not separated from the row of words. The user, therefore, can easily select the candidate word at its proper position, while referring to the preceding and succeeding words.

Still another object of the present invention is to provide an electronic typewriter capable of word processing by displaying at least a part of a row of words, the typewriter comprising generating means for generating candidate correct words for a possibly misspelled word in the row, display means for displaying the row of words, and display control means for displaying plural candidate correct words together with a row of words being edited, by replacing a part of the row with a candidate word on said display means.

BRIEF DESCRIPTION OF THE DRAWINGS

FIG. 4 is a schematic chart showing an example of the order of candidate words;

FIG. 5 is a schematic view showing the structure of a first-in-first-out buffer memory;

FIG. 6 is a schematic view showing the content of a buffer memory;

FIG. 7 is a schematic view of a counter provided in a RAM;

FIG. 9 is a schematic view showing the state of display.

DESCRIPTION OF THE PREFERRED EMBODIMENTS

Now the present invention will be explained in detail with reference to an embodiment thereof shown in the appended drawings.

Figure 1:
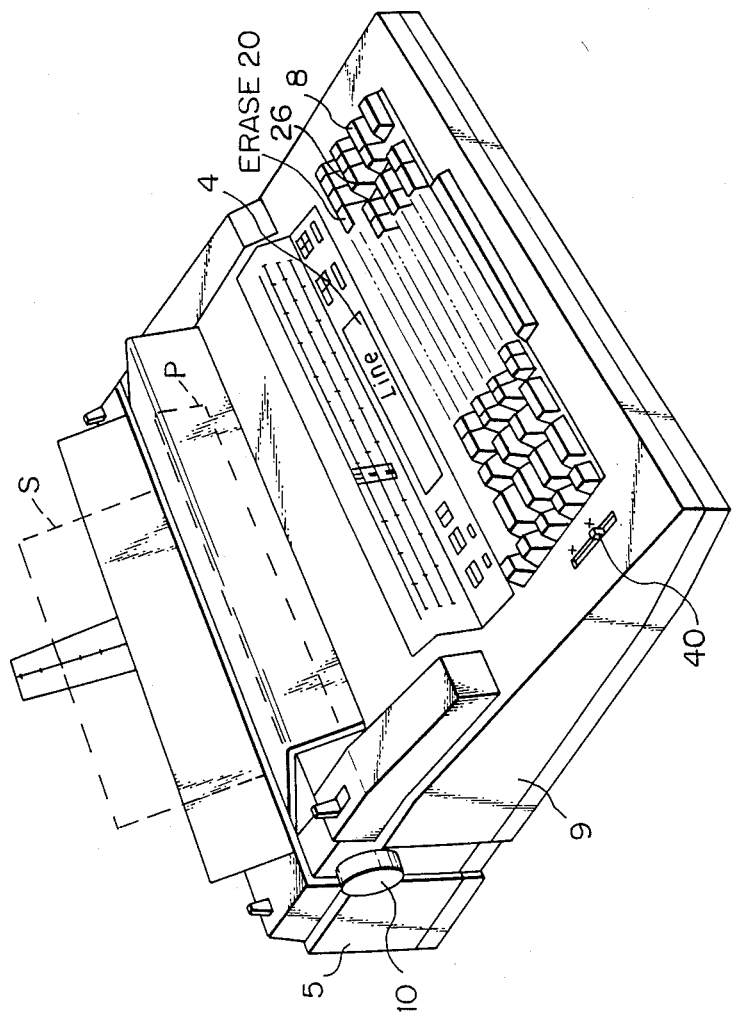
FIG. 1 an external view of the electronic typewriter embodying the present invention.

FIG. 1 is an external view of an electronic typewriter embodying the present invention, wherein shown are a main body 9; a display unit 4 of one or two lines for displaying a row of entered letters and a candidate word; a keyboard 8; a printer 5; a platen knob 10 for manually rotating a platen P on which a recording sheet S is supported; a key 40 for underlining the entered words or the candidate word, or displaying such words in gothic style, as will be explained later. Since the external appearance is almost same as that of an ordinary electronic typewriter, detailed explanation will be omitted.

Figure 2:
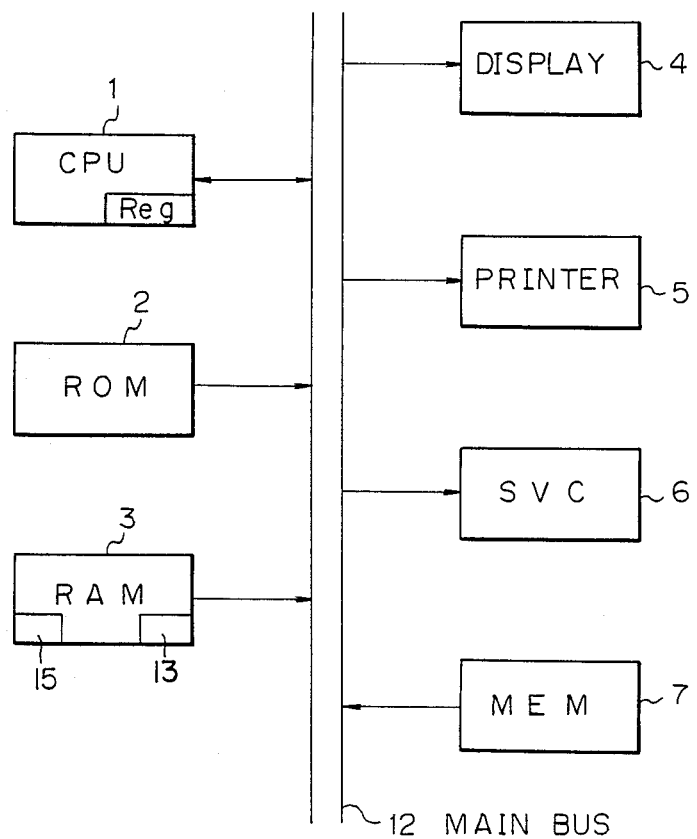
FIG. 2 is a block diagram of said electronic typewriter.
Figure 3:
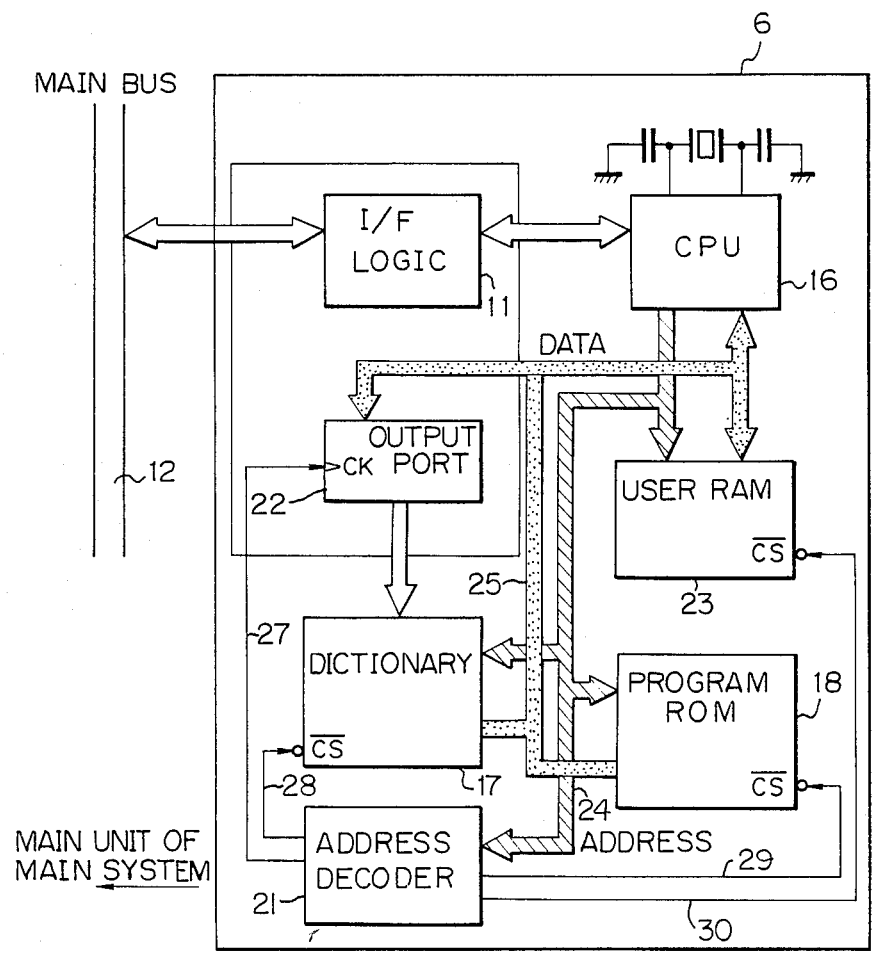
FIG. 3 is a block diagram of a circuit board for a spelling verifier and corrector.

FIG. 2 is a block diagram of the principal part of said electronic typewriter, wherein shown are a main CPU 1 for controlling the entire apparatus; a read-only memory (ROM) 2; a random access memory (RAM) 3; a display unit 4; a printer 5; a circuit board 6 of a spelling verifier and corrector (SVC); and a text memory 7; all connected to a main bus 12. FIG. 3 is a detailed block diagram of the SVC board 6.

Referring to FIG. 3, the SVC board 6 is provided with a program ROM 18 storing a program for selecting candidate words in response to input data from a CPU 16 for SVC control and according to data stored in a dictionary 17. The CPU 16 controls the selection of the candidate words from the dictionary 17 by means of an address decoder 21 and an output port 22 and utilizing the temporary storage of a user RAM 23. The CPU 16, output port 22, dictionary 17, address decoder 21, user RAM 23, and program ROM 18 are interconnected by an address bus 24 and a data bus 25. The address decoder 21 is connected to an input CK of output port 22 by a line 27, and respectively to inputs CS of the dictionary 17, program ROM 18, and user RAM 23 by lines 28, 29, and 30. The CPU 16 also controls data exchange with the CPU 1 through an interface logic 11 and the main bus 12. Control is conducted in the following manner:

(1) The CPU 16 receives a word from the main bus 12 through the interface logic 11, verifies whether the word is a correct one, and sends the result of verification back to the main bus 12;

(2) The CPU 16 receives a word from the main bus 12, and if apparently misspelled, sends words estimated from said received word, as candidate correct words for the misspelled word, back to the main bus 12.

Among these functions, the latter, which is the object of the present invention, provides plural candidate words depending on the input word. As an example, in response to a misspelled word "spel", candidate words "sped", "spew" and "spell" are provided in succession as shown in FIG. 4 and sent to the main bus 12. These candidate words sent to the main bus 12 are stored and taken out in first-in-first-out manner by a buffer memory 13 provided in the RAM 3, as shown in FIG. 5. Each unit 13a of the buffer memory 13 is composed, as shown in FIG. 6, of cells 14 of 32 bytes, wherein the first byte is used for indicating the number of letters constituting the word, and the remaining 31 bytes are used to store the word.

In case the operator enters a sentence "How do you spel Mississippi?" and then intends to correct the misspelled word "spel", a cursor 31 (FIGS. 9(a) to 9(j)) is positioned, on the display unit 4, immediately behind the misspelled word "spel" and an instruction for correction is entered by the keyboard 8 through a key, e.g. 26. In response the display changes to "How do you sped Mississippi?". Since the sentence is still wrong, the operator again enters the instruction for correction, whereupon the display 4 again changes to "How do you spew Mississippi?". As the sentence is still wrong, the operator again enters the instruction for correction, thus obtaining a correct sentence "How do you spell Mississippi?" on the display unit 4. In the following description there will be explained in detail the process made in the electronic typewriter, on the generation and display of candidate words explained above.

According to the present invention, in order to achieve these functions, there is employed a counter DCNT 15, shown in FIG. 7, which is provided in the RAM 3 and utilized as will be explained later.

Figure 8:
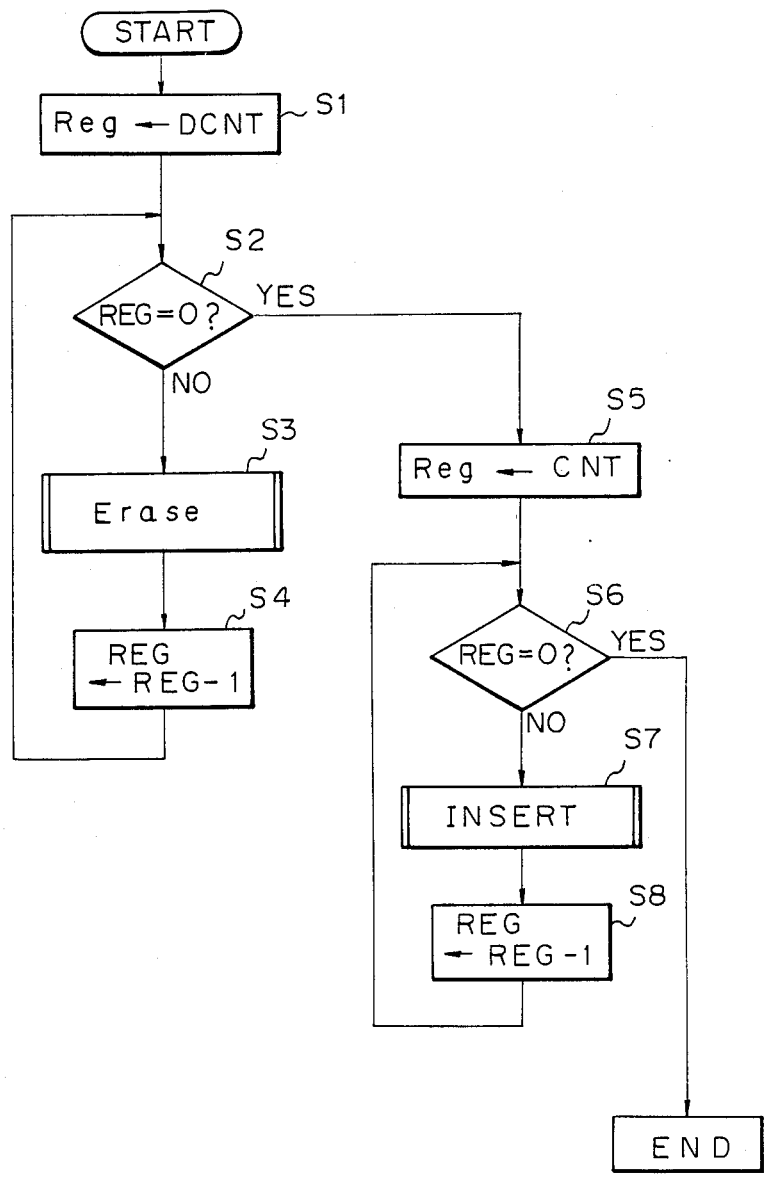
FIG. 8 is a flow chart showing a control sequence.

FIG. 8 is a flow chart showing the control sequence of the present invention, and FIG. 9 illustrates an example of display on the display unit 4. It is assumed that the cursor 31 is positioned immediately behind the word "spew", as shown in FIG. 9(a). As will be explained later, the counter DCNT 15 stores a number "4", indicating that the word "spew" is composed of 4 letters, and a step S1 stores the content of said counter DCNT 15 in a register REG in the CPU 1. A step S2 inspects the content of the register REG, and, if the content is not zero, indicating that some of the letters of the candidate word "spew" are displayed, a step S3 executes an erase process in the same manner as if an erase key 20 in the keyboard 8 (FIG. 1) is actuated. Thus the display changes to a state shown in FIG. 9(b), and the program proceeds to a step S4, in which the content of the register REG is decreased by one. Then the program returns to the step S2, and, since the content of the register REG is still not zero, the program proceeds to the step S3. In this manner the above-explained loop is repeated until the content of register REG becomes equal to zero. Thus the display changes in succession, from a state shown in FIG. 9(b), through (c) and (d), to (e). When the content of the register REG becomes equal to zero (FIG. 9(e)), the program proceeds from the step S2 to step S5, in which the succeeding candidate word "spell" is taken out from the aforementioned buffer memory 14. In this state, the content of the counter CNT is stored in the counter DCNT 15 and also stored in the register REG in the CPU 1. In this case said content is "5". Subsequently a step S6 inspects the content of the register REG, and since said content is not zero, a step S7 inserts the first letter "s" in the same manner as the key "s" of the keyboard 8 is actuated. The display obtained in this state is shown in FIG. 9(f). A succeeding step S8 decreases the content of the register REG by one, and the program returns to the step S6, thus achieving a loop control. In this manner the display changes in the order of FIG. 9(g), (h), (i), and (j) to complete the display of a candidate word. Thus the operator can easily understand the replaced word and the position thereof.

These operations are repeated to finally display "spell" as shown in FIG. 4. As will be apparent from FIG. 9, as the display undergoes changes from "spew" to "spell" at the position of the correction process, the succeeding word "Mississippi?" is displaced thereby clarifying the relationship of the candidate word and the preceding and succeeding words, and facilitating the correction of spelling.

Also as explained before, the erasing or inserting process is conducted in the same manner as the process conducted when a corresponding key erase 20 of the keyboard 8 is actuated, so that the state for example of an underlining switch 40 is reflected in said process. Thus the candidate word can be displayed with an underline, by positioning the switch 40 at the underlining mode prior to the instruction for correction.

As explained in the foregoing, the present invention enables easy spelling correction even in an inexpensive word processor with a display capacity of one or several lines.

Also the present invention performs the spelling correction process with an extremely simple structure, since the erasing process and the letter entry process employed in the spelling correction are made the same as those instructed from the keyboard 8.

Furthermore the present invention provides a word processor of satisfactory operability, since the spelling correction can be achieved while confirming the preceding and succeeding words.

Furthermore the present invention allows the display of the condidate words, not in an area separate from the row of words to be edited but in the proper position in the row, and the succeeding letters are suitably displaced according to the number of letters constituting each candidate word, so that the editing and the spelling correction can be made on a real time basis.

It is also possible, after the entry of the entire text, to effect spelling verification manually or automatically, then to automatically move the cursor in succession to the words to be corrected, and to display the candidate words in the above-explained display form.

What is claimed is:

1. A word processor having a spelling verification and word correction function, comprising:
    display means for displaying at least a part of one line of words;
    generating means for generating a plurality of candidate correct words for one of the words, in that part of the line displayed by said display means, that is possibly misspelled; and
    display control means for controlling said display means to display one of the plurality of candidate correct words together with other words displayed by said display means by replacing the possibly misspelled word with the one candidate correct word.

2. A word processor according to claim 1, wherein said generating means comprises dictionary means for storing candidate correct words and means for reading candidate correct words from said dictionary means, in response to an input word.

3. A word processor according to claim 1, wherein said display control means includes memory means for storing the plurality of candidate correct words generated by said generating means, said memory means storing character data representing the characters constituting each one of the plurality of candidate correct words and the number of characters constituting each one of the plurality of candidate correct words.

4. A word processor according to claim 1, further comprising:
   erasure instruction means for instructing erasure of a character on said display means;
   insertion instruction means for instructing insertion of a character on said display means; and
   program memory means for storing an erasure process program for executing a character erasure process on said display means in respone to an instruction by said erasure instruction means and an insertion process program for executing a character insertion process on said display means in response to an instruction by said insertion instruction means;
   wherein said display control means controls said display means using both the erasure process program and the insertion process program upon display of one of the plurality of candidate correct words.

5. A word processor according to claim 4, wherein said program memory means stores a candidate correct word display program including the erasure process program and the insertion process program.

6. A word processor according to claim 1, further comprising means for setting an underline mode in which upon input of a character, an underline is automatically added to the character, wherein said display control means controls said display means to display one of the plurality of candidate correct words with an underline in the event the underline mode has been set by said setting means.

7. A word processor according to claim 1, further comprising cursor generating means for generating a cursor for display by said display means, and wherein said display control means controls movement of the cursor indicating a position on said display means to move the cursor to a position corresponding to the possibly misspelled word.

8. A word processor having a spelling verification and word correction function, comprising:
   display means for displaying at least a part of one line of words;
   designation means for designating one of the words displayed by said display means for a position of the one word in the part of the line of words;
   instruction means for instructing correction of the one word;
   generating means for generating candidate correct words corresponding to the one word designated by said designation means; and
   control means for controlling said display means to display one of the candidate correct words replacing the one word designated by said designation means to displace the position of designation by said designation means in accordance with the length of said candidate correct word.

9. A word processor according to claim 8, wherein said designation means performs said designation with a cursor displayed by said display means.

10. A word processor according to claim 8, wherein said designating means designates a word by placing a cursor at the end thereof for display by said display means.

11. A word processor according to claim 8, wherein said control means includes memory means for storing the candidate correct words generated by said generating means, said memory means storing character data representing the characters constituting each one of the candidate correct words and the number of characters constituting each one candidate correct word.

12. A word processor according to claim 8, further comprising:
   erasure instruction means for instructing erasure of a character on said display means;
   insertion instruction means for instructing insertion of a character on said display means; and
   program memory means for storing an erasure process program for executing a character erasure process on said display means in respone to an instruction by said erasure instruction means and an insertion process program for executing a character insertion process on said display means in response to an instruction by said insertion instruction means;
   wherein said control means controls said display means using both the erasure process program and the insertion process program.

13. A word processor according to claim 12, wherein said program memory means stores a candidate correct word display program including the erasure process program and the insertion process program.

14. A word processor according to claim 8, further comprising means for setting an underline mode in which upon input of a character, an underline is automatically added to the character, wherein said control means controls said display means to display one of the candidate correct words with an underline in the event the underline mode has been set by said setting means.

15. A word processor according to claim 9, wherein said control means controls the cursor to move to a position corresponding to the possibly misspelled word.

* * * * *

UNITED STATES PATENT AND TRADEMARK OFFICE
CERTIFICATE OF CORRECTION

PATENT NO. : 4,859,091

DATED : August 22, 1989

INVENTOR(S) : Hiroyuki Ueda

It is certified that error appears in the above-identified patent and that said Letters Patent is hereby corrected as shown below:

TITLE PAGE,
[56] References Cited
    Change "IBM Technical Disclosure Bulletin, "Interactive Spelling Correction Air for a Text Processing System"" to --IBM Technical Disclosure Bulletin, "Interactive Spelling Correction Aid for a Text Processing System"--.

COLUMN 1
    Line 34, change "abovementioned" to --above-mentioned--.

COLUMN 2
    Line 3, change "FIG. 1 an" to --FIG. 1 is an--.
    Line 36, change "same" to --the same--.

COLUMN 3
    Line 2, change "and" to --and,--.

UNITED STATES PATENT AND TRADEMARK OFFICE
CERTIFICATE OF CORRECTION

PATENT NO. : 4,859,091

DATED : August 22, 1989

INVENTOR(S) : Hiroyuki Ueda

It is certified that error appears in the above-identified patent and that said Letters Patent is hereby corrected as shown below:

COLUMN 4
    Line 24, change "key erase 20" to --key ERASE 20--.
    Line 45, change "condidate" to --candidate---.
    Line 50, change "real time" to --real-time--.

COLUMN 5
    Line 26, change "respone" to --response--.

COLUMN 6
    Line 2, change "for" to --by--.
    Line 12, change "means to" to --means and to--.
    Line 19, change "said designating means" to --said designation means--.
    Line 37, change "respone" to --response--.

Signed and Sealed this

Twenty-fourth Day of July, 1990

Attest:

HARRY F. MANBECK, JR.

*Attesting Officer*      *Commissioner of Patents and Trademarks*